(12) United States Patent  
Montgomery et al.

(10) Patent No.: US 8,749,398 B2
(45) Date of Patent: *Jun. 10, 2014

(54) METHODS FOR CLOCK SYNCHRONIZATION IN WELLBORE INSTRUMENTS

(71) Applicant: Intelliserv, LLC, Houston, TX (US)

(72) Inventors: Michael A. Montgomery, Sugar Land, TX (US); Julius Kusuma, Stafford, TX (US)

(73) Assignee: Intelliserv, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/769,055

(22) Filed: Feb. 15, 2013

(65) Prior Publication Data

US 2013/0154844 A1     Jun. 20, 2013

Related U.S. Application Data

(63) Continuation of application No. 12/471,839, filed on May 26, 2009, now Pat. No. 8,378,839.

(51) Int. Cl.
*G01V 3/00* (2006.01)

(52) U.S. Cl.
USPC .................................................. 340/853.7

(58) Field of Classification Search
USPC .................. 340/853.7, 854.1, 855.4
See application file for complete search history.

(56) References Cited

U.S. PATENT DOCUMENTS 8,378,839 B2 *    2/2013   Montgomery et al. .... 340/853.7

* cited by examiner

*Primary Examiner* — William P Neuder
(74) *Attorney, Agent, or Firm* — Conley Rose, P.C.

(57) ABSTRACT

A method for synchronizing a clock in a device at the Earth's surface with a device disposed in a wellbore includes generating a time datum for a signal generated at at least one of the surface and in the wellbore proximate an end of the pipe string. A time delay is determined between detection of the signal at the at least one repeater and retransmission of the signal from the at least one repeater. The time datum is appended with a signal corresponding to the time delay. The retransmitted signal is detected at the other of proximate the end of the pipe string and at the surface.

25 Claims, 3 Drawing Sheets

US 8,749,398 B2

METHODS FOR CLOCK SYNCHRONIZATION IN WELLBORE INSTRUMENTS

CROSS-REFERENCE TO RELATED APPLICATIONS

The present application is a continuation of U.S. patent application Ser. No. 12/471,839, filed on May 26, 2009, entitled "Method For Clock Synchronization In Wellbore Instruments."

STATEMENT REGARDING FEDERALLY SPONSORED RESEARCH OR DEVELOPMENT

Not applicable.

BACKGROUND

The invention relates generally to the field of wellbore instruments and well logging methods. More specifically, the invention relates to systems and methods for synchronizing various instrument clocks in an instrument string disposed in a well.

Well logging instruments are devices configured to move through a wellbore drilled through subsurface rock formations. The devices include one or more tools and other devices that measure various properties of the subsurface rock formations and/or perform certain mechanical acts on the formations, such as drilling or percussively obtaining samples of the rock formations, and withdrawing samples of connate fluid from the rock formations. Measurements of the properties of the rock formations may be recorded with respect to the instrument axial position (depth) within the wellbore as the instrument is moved along the wellbore. Such recording is referred to as a "well log."

Well logging instruments can be conveyed along the wellbore by extending and withdrawing an armored electrical cable ("wireline"), wherein the instruments are coupled to the end of the wireline. Extending and withdrawing the wireline may be performed using a winch or similar spooling device known in the art. However, such conveyance relies on gravity to move the instruments into the wellbore, which can only be used on substantially vertical wellbores. Those wellbores deviating from vertical require additional force to move through the wellbore.

There are several types of wireline instrument conveyance known in the art for the foregoing conditions. One conveyance technique includes coupling the wireline instruments to the end of a coiled tubing having a wireline disposed therein. The wireline instruments are extended into and withdrawn from the wellbore by extending and retracting the coiled tubing, respectively. A subset of such coiled tubing techniques includes preliminary conveyance of the wireline configurable well logging instruments to a selected depth in the wellbore. See, for example, U.S. Pat. No. 5,433,276 issued to Martain et al. However, the use of coiled tubing with wireline instruments is costly and is inherently limited by the amount of pushing force capable with the coiled tubing. As a result, the use of coiled tubing is typically problematic in extended reach wells.

Another well logging instrument conveyance technique includes coupling wireline configurable well logging instruments to the end of a drill pipe or similar threadedly coupled pipe string. A wireline is coupled to the instruments using a "side entry sub" which provides a sealable passage from the exterior of the pipe string to the interior thereof. As the pipe string is extended into the wellbore, the wireline is extended by operating a conventional winch. An example of the foregoing is described in U.S. Pat. No. 6,092,416 issued to Halford et al. and assigned to the assignee of the present invention. However, this conveyance technique is frequently unreliable as the wireline is positioned in the annulus and subject to crushing, splicing or other damage. For example, the wireline may become pinched between the drill pipe and the casing or wellbore. Another drawback to using drill pipe to convey the well logging instruments using procedures known in the art is that the cable disposed outside the pipe disturbs the operation of the sealing equipment and makes it difficult to seal the drill pipe to maintain fluid pressure.

Additionally, the well logging instruments may be positioned at the end of a drill pipe without use of a wireline cable. In such circumstances, each well logging instrument is provided with a battery and memory to store the acquired data. As a result, the well logging instruments cannot communicate with the surface while downhole. Therefore, the data acquired cannot be analyzed at the surface until the wireline instruments return to the surface. Without any communication with the surface, surface operators cannot be certain the instruments are operating correctly, cannot control the instruments while downhole, and the data cannot be analyzed until after the wireline instruments are removed from the wellbore.

Recently, a type of drill pipe has been developed that includes a signal communication channel. See, for example, U.S. Pat. No. 6,641,434 issued to Boyle et al. and assigned to the assignee of the present invention. Such drill pipe, known as wired drill pipe, has in particular provided substantially increased signal telemetry speed for use with LWD instruments over conventional LWD signal telemetry, which typically is performed by mud pressure modulation or by very low frequency electromagnetic signal transmission.

In any of the foregoing examples, as well as other types of well logging instrumentation, a record is made of the measurements made by the various sensors in the instruments, typically with respect to time. A record is also made of the instrument depth with respect to time. In order to produce an accurate record of instruments sensor measurements with respect to the depth in the wellbore, it is necessary to have accurate time indexing of the recorded measurements. Certain types of instruments make measurements that are dependent on accurate time reference, for example, instruments that measure electromagnetic propagation and acoustic travel time properties. Accordingly, it is desirable to have accurate time references for the various measurements made by the instruments in the wellbore. Typically, time reference is provided by a master clock. The master clock is then synchronized to the various instrument clocks in the instrument string. What are needed are methods for precise synchronization of various instrument clocks to a master clock.

SUMMARY OF THE DISCLOSURE

One aspect of the invention is a method for synchronizing a clock in a device at the Earth's surface with a clock in a device disposed in a wellbore, wherein signals are communicated therebetween along a wired pipe string. The wired pipe string has at least one signal repeater disposed at a selected position between an upper end and a lower end of the wired pipe string. The method include generating a time datum for a signal generated by either one of the surface device and the device disposed in the wellbore. The generated signal is transmitted along the wired pipe string to the at least one repeater. The generated signal is detected in the at least one repeater. A time delay is determined between detection of the signal at the at least one repeater and retransmission of the signal from the at least one repeater. The time datum is appended with a signal corresponding to the time delay. The signal with the appended time datum is retransmitted by the at least one repeater.

A method for synchronizing clocks in a wellbore instrument according to another aspect of the invention includes generating a clock signal at a first clock. The clock signal at a second clock and a timing of the second clock is adjusted corresponding to the clock signal. The clock signal has an autocorrelation function narrower in time than a period of the clock signal. The detecting includes at least one of correlation, peak detection and threshold detection.

Another aspect of the invention is a system for synchronizing a clock associated with a device disposed at the Earth's surface with a clock associated with at least one instrument disposed in a subsurface wellbore. The surface device and the wellbore device are in signal communication using a communication channel in a wired pipe string. The wired pipe string includes at least one repeater disposed between a surface end and a lower end in the wellbore thereof. The system includes a clock time datum generator associated with at least one of the surface device and the wellbore device. The time datum generator is configured to append a time datum to a signal generated by the at least one of the surface device and the wellbore device. The at least one repeater includes a detector configured to detect the signal from the at least one of the wellbore device and the surface device, a transmitter to retransmit the detected signal, and a time delay calculator configured to determine a delay time between detection of the signal and retransmission thereof. The time delay calculator is configured to alter the detected signal with a signal corresponding to the time delay.

Other aspects and advantages of the invention will be apparent from the following description and the appended claims.

DETAILED DESCRIPTION

Figure 1:
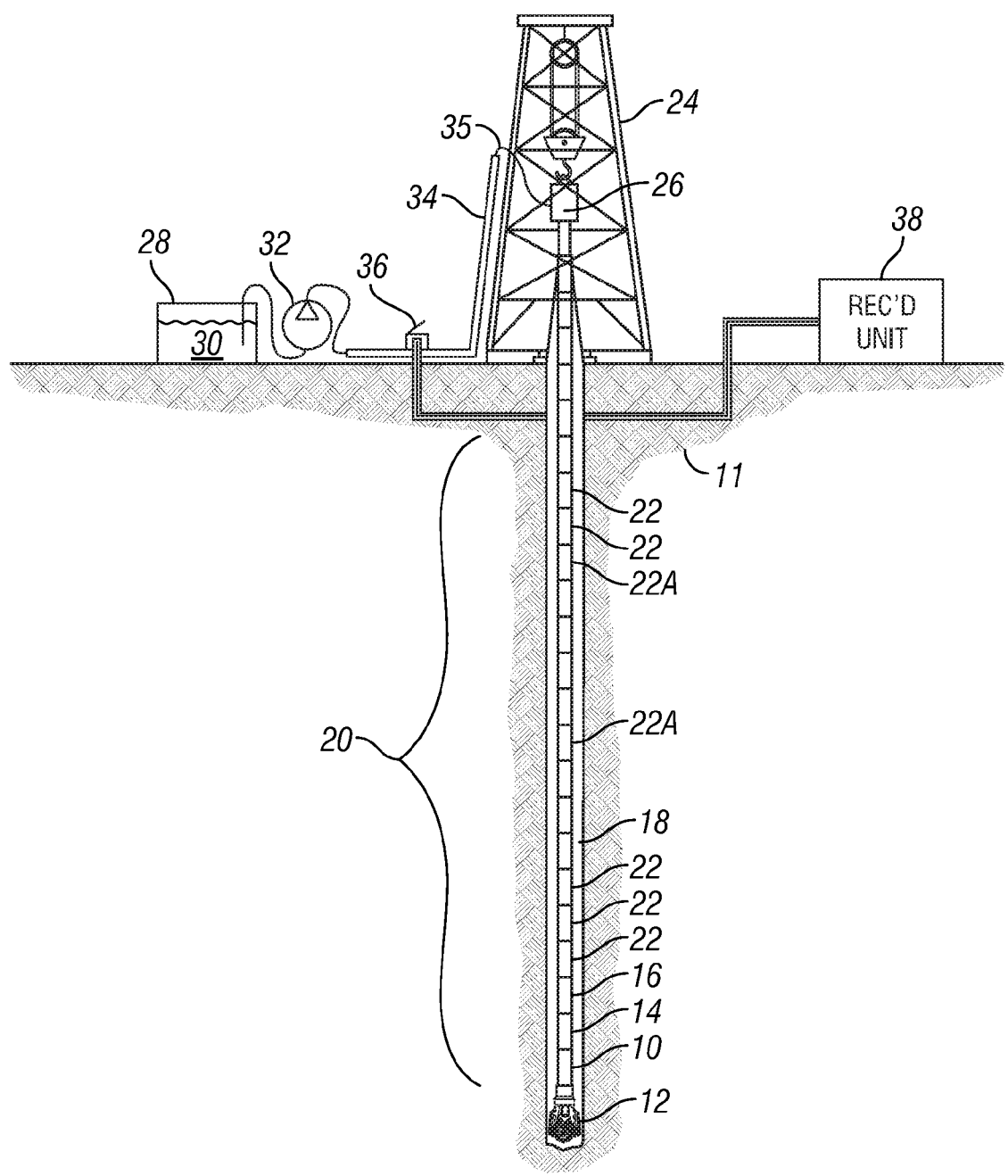
FIG. 1 shows an example of well logging instruments being conveyed through a wellbore using a wired pipe string.

In some examples, the invention relates to devices for conveying a wellbore instrument or a "string" of such instruments through a wellbore using a wired pipe string for conveyance and signal communication. In FIG. 1, a drilling rig 24 or similar lifting device suspends a conduit called a "drill string 20" within a wellbore 18 being drilled through subsurface formations 11. The drill string 20 may be assembled by threadedly coupling together end to end a number of segments ("joints") 22 of drill pipe. The drill string 20 may include a drill bit 12 at its lower end. When the drill bit 12 is axially urged into the formations 11 at the bottom of the wellbore 18 and when it is rotated by equipment (e.g., top drive 26) on the drilling rig 24, such urging and rotation causes the bit 12 to axially extend ("deepen") the wellbore 18. The lower end of the drill string 20 may include, at a selected position above and proximate to the drill bit 12, an electric generator sub 10 according to various aspects of the invention and which will be further explained below. Proximate its lower end of the drill string 20 may also include a first well logging instrument 14, which may in the present example be a logging while drilling ("LWD") instrument, and a second well logging instrument 16, which in the present example may also be a LWD instrument of types well known in the art. LWD instruments are typically disposed in a drill collar or similar pipe segment that is configured to be coupled into the drill string 20 as an active component thereof.

In other examples, the instruments 10, 14 may be so called "wireline configurable" or "wireline" instruments. Such wireline instruments are configurable to be extended into the wellbore 18 and retracted therefrom at the end of an armored electrical cable (not shown in the example of FIG. 1), however such instruments may also be used at the end of a wired pipe string such as shown at 20 in FIG. 1. Specific examples of the well logging instruments 10, 14 will be explained below with reference to FIGS. 2 and 3, however for purposes of describing the present invention, the well logging instruments 10, 14 may be any type known in the art, including without limitation, acoustic velocity measuring devices, density measuring devices, neutron hydrogen index measurement devices, neutron capture cross section measurement devices, natural gamma radiation emission measurement devices, neutron induced gamma ray spectroscopy devices, nuclear magnetic resonance relaxometry measurement devices, and formation fluid pressure and sample withdrawal measurement devices.

When wireline configurable instruments are used, the drill bit 12 may or may not be included in the assembly of tools coupled to the drill string 20, depending on the specific logging instrument and drill string configuration used. Accordingly, as used in the present description, "logging instruments" is intended to mean any such instrument, and for purposes of the present invention may be conveyed as part of the drill string in the form of LWD instruments, or may be wireline configurable and coupled to the drill string 20 by a suitable adapter, retainer or other device.

It should also be clearly understood that the types of measurements made by the logging instruments 10, 14 may include those related to the geodetic trajectory of the wellbore 18, including inclination from vertical and geodetic or magnetic compass direction. Ordinarily such instruments are used to assist drilling the wellbore along a preselected or other trajectory and are by convention referred to as "measurement while drilling" ("MWD") instruments. For purposes of the present description, however, such MWD instruments are within the scope of the general description "well logging instruments."

A telemetry unit 16 may include both electromagnetic (or optical) signal telemetry devices and fluid flow modulation telemetry devices (not shown separately in FIG. 1) to communicate commands from the surface and to communicate measurements made by the well logging instruments 10, 14 to the surface. Specific, non-limiting examples of the well logging instruments 10, 14 will be further explained below with reference to FIGS. 2 and 3.

The drill string 20 in the present example may be a so-called "wired" pipe string that has associated with each pipe joint an electrical signal conductor or associated cable (not shown separately in FIG. 1) for communicating signals from the logging instruments 10, 14 to the surface (e.g., recording unit 38) and from the surface to the logging instruments 10, 14. Non-limiting examples of such wired, threadedly coupled drill pipe are described in U.S. Patent Application Publication No. 2006/0225926 filed by Madhavan et al., the underlying patent application for which is assigned to the assignee of the present invention and U.S. Pat. No. 6,641,434 issued to Boyle et al. also assigned to the assignee of the present invention. When such "wired" drill pipe is used, the telemetry unit 16 will typically include suitable devices for coupling signals from the logging instruments 10, 14 to the signal channel in the drill string 20. In other examples, where the well logging instruments 10, 14 are of the wireline conveyable type, the telemetry unit 16 or other device (not shown) in the drill string 20 may also provide mechanical crossover coupling between typical drill string threaded connectors and wireline instrument threaded connectors (not shown).

During drilling of the wellbore 18, a pump 32 lifts drilling fluid ("mud") 30 from a tank 28 or pit and discharges the mud 30 under pressure through a standpipe 34 and flexible conduit 35 or hose, through the top drive 26 and into an interior passage (not shown separately in FIG. 1) inside the drill string 20. The mud 30 exits the drill string 20 through courses or nozzles (not shown separately) in the drill bit 12, where it then cools and lubricates the drill bit 12 and lifts drill cuttings generated by the drill bit 12 to the Earth's surface. In some examples, in particular where the well logging instruments 10, 14 are LWD instruments, signals from the well logging instruments 10, 14 may converted by a telemetry transmitter (not shown separately) in the telemetry unit 16 that modulates the flow of the mud 30 through the drill string 20. Such modulation may cause pressure variations in the mud 30 that may be detected at the Earth's surface by a pressure transducer 36 coupled at a selected position between the outlet of the pump 32 and the top drive 26. Signals from the transducer 36, which may be electrical and/or optical signals, for example, may be conducted to a recording unit 38 for decoding and interpretation using techniques well known in the art. The decoded signals typically correspond to measurements made by one or more of the sensors (not shown in FIG. 1) in the well logging instruments 10, 14. For purposes of the present invention, the mud flow modulation telemetry is described only to show that such telemetry can be used in addition to the wired telemetry used in connection with the wired drill pipe string 20.

It will be appreciated by those skilled in the art that the top drive 26 may be substituted in other examples by a swivel, kelly, kelly bushing and rotary table (none shown in FIG. 1) for rotating the drill string 20 while providing a pressure sealed passage through the drill string 20 for the mud 30. Accordingly, the invention is not limited in scope to use with top drive drilling systems.

When wired drill pipe is used for the drill string 20, the drill string 20 may include a signal repeater 22A at selected positions along its length. The signal repeaters 22A are used to receive and retransmit signals communicated in either direction along the drill string 20 so that there is sufficient signal amplitude at the LWD instruments 10, 14 in the wellbore to detect commands transmitted from the recording unit 38, and for the recording unit to detect signals transmitted by the telemetry unit 16 in response to measurements made by the well logging instruments 10, 14. One example of a structure for the repeaters 22A is described in U.S. Pat. No. 7,224,288 issued to Hall et al.

Figure 2:
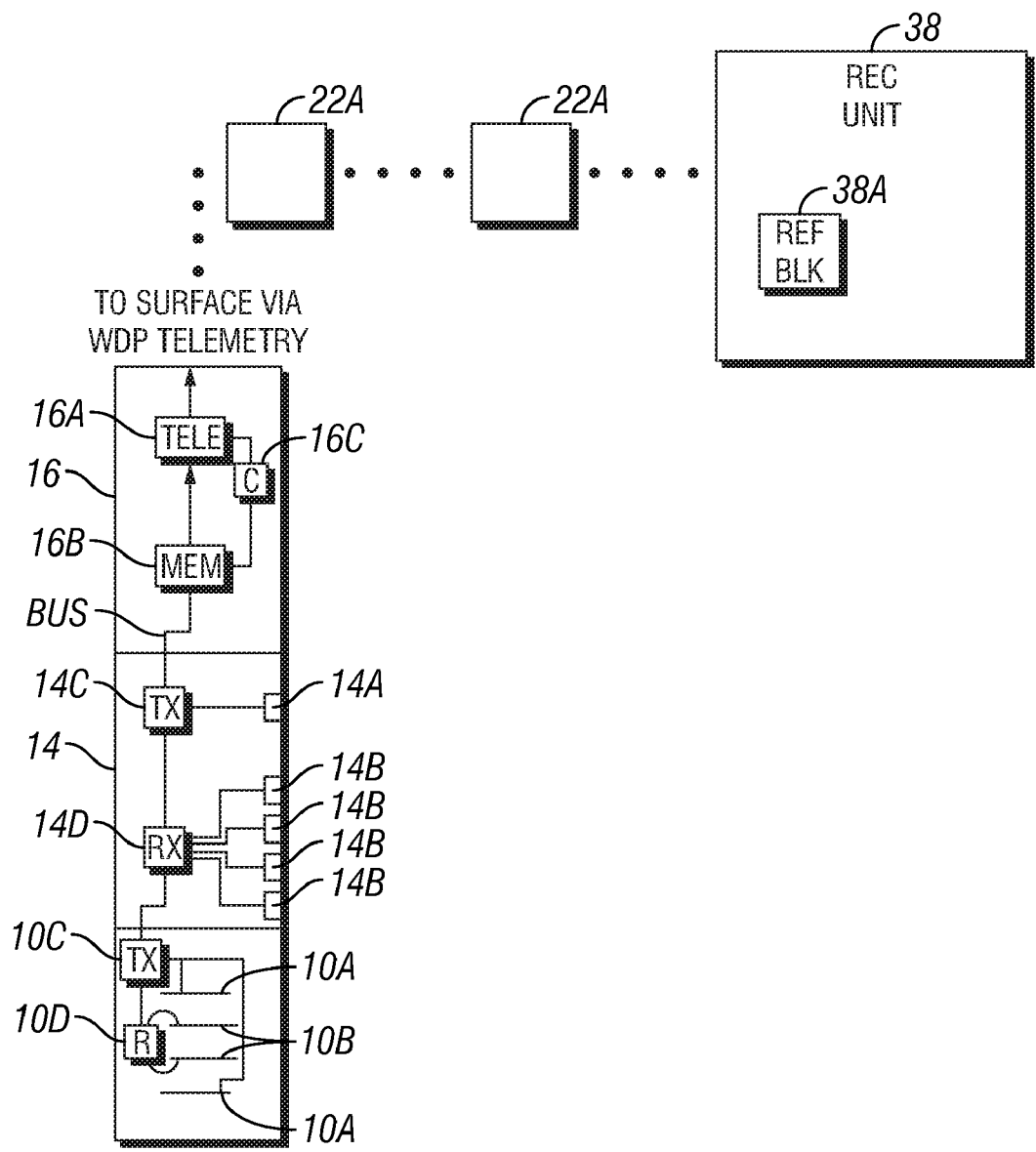
FIG. 2 shows a functional block diagram of example LWD instruments to illustrate clock synchronization between surface and the wellbore, and between instrument components.

FIG. 2 shows a functional block diagram of examples of wellbore instruments, such as well logging instruments 10, 14 as well as the telemetry unit 16, the surface recording unit 38 and repeaters 22A in order to explain one aspect of the invention. The recording unit 38 may include a reference timing device or clock 38A ("surface clock"). The surface clock 38A, depending on where the recording unit 38 is located geodetically, may or may not be synchronized to a standard time reference, such as the master time reference of the National Institute of Standards and Technology. Irrespective of any external time synchronization, the reference clock 38A may provide time datum markers (or "stamps") to any signals transmitted from the recording unit 38 to the instruments 10, 14 in the wellbore 18, and may apply similar time stamps to any signals received from the instruments 10, 14 in the wellbore 18 for subsequent recording and interpretation.

One or more of the instruments in the wellbore, for example, the telemetry unit 16, may include its own clock 16C for timing operation of the various components in the telemetry unit 16, such as a telemetry transceiver 16A and a data mass storage device or buffer 16B. As explained above with reference to FIG. 1, the following description will include specific types of well logging instruments for the purpose of explaining the invention, however the types of instruments described below are not intended to limit the scope of the types of well logging instruments or other instruments that may be used with the invention. The second well logging instrument 10 may include, for example, devices for measuring electrical conductivity of the formations adjacent to the wellbore. Such devices may include one or more electromagnetic transmitters 10A coupled to a transmitter driver 10C, and one or more electromagnetic receivers 10B coupled to a receiver circuit 10D. Electrical conductivity may be determined by measuring variation of properties of electromagnetic waves as detected by the receivers 10B with respect to the electromagnetic waves as they are emitted by the transmitters 10A. Such properties, as will be appreciated by those skilled in the art include phase shift, measurement of which requires precise timing of the transmission of the electromagnetic waves and precise timing of their detection by the receivers 10B. Timing of the transmitter driver 10C and the receiver circuit 10D may be controlled by a local clock (not shown in FIG. 2) in the instrument 10, by individual local clocks at each of the driver 10C and the receiver circuit 10D (neither clock shown in FIG. 2) or by the clock 16C in the telemetry unit 16. Another example of measurements that may be made in the wellbore include, in the first LWD instrument 14, acoustic properties such as velocity. An acoustic transmitter 14A may be operated by a transmitter driver 14C. One or more acoustic receivers 14B may be coupled to a receiver circuit 14D. Travel time, and changes in properties of acoustic waves generated by the transmitter 14A may be determined by measuring properties of the acoustic waves detected by each of the receivers 14B. As will be appreciated by those skilled in the art, such measurement and determination require precise timing of emission of the acoustic waves and precise timing of their detection by the receivers 14B. As is the case with the second LWD instrument 10, the first LWD instrument 14 may include its own local clock (not shown) or individual local clocks (not shown) associated with each of the transmitter driver 14C and the receiver circuits 14D. While not shown in FIG. 2, such local instrument clocks will be shown and further explained below with reference to FIG. 3.

The foregoing example of instruments in the wellbore is only provided to illustrate principles of the various aspects of the invention and is in no way intended to limit the types of instruments, the numbers of instruments or the locations of timing devices that may be used with various examples of the invention.

For convenience in the present description, signals generated by the recording unit 38 for communication to the one or more well logging instruments 10, 14 in the wellbore (18 in FIG. 1) may be referred to as "command signals." Such reference is made because in general, the recording unit 38 sends signals to the logging instruments 10, 14 in the wellbore (18 in FIG. 1) for purposes of controlling their operation. However, it is to be understood that data or other types of signals may be communicated from the recording unit 38 to the logging instruments 10, 14 in the wellbore (18 in FIG. 1), including, for example, data such as instrument calibration data. Accordingly, the use of the term "command signal" is not in any way intended to limit the type of signal that may be transmitted from the recording unit 38 to the logging instruments 10, 14 in the wellbore (18 in FIG. 1) consistent with the scope of the present invention. Correspondingly, signals transmitted from the instruments in the wellbore to the recording unit 38 may be referred to for convenience as "measurement signals", because instrument measurements are primarily what are communicated from the wellbore to the recording unit 38. However, as is the case with "command signals" the use of the term "measurement signals" is only shorthand and is not intended to limit the types of signals sent from the instruments 10, 14, 16, to the recording unit 38 consistent with the scope of the present invention.

When the well logging instruments 10, 14 in the wellbore (18 in FIG. 1), make measurements corresponding to, for example, trajectory of the wellbore and properties of the formations surrounding the wellbore (18 in FIG. 1), such measurements are typically indexed with respect to the time at which the particular measurements are made. Contemporaneously, a record indexed with respect to time is made in the recording unit 38 of the axial position (depth) of the well logging instruments 10, 14 in the wellbore (18 in FIG. 1). Such record of axial position may be time correlated to the time indexed record of measurements made by the well logging instruments 14, 10 to produce a record with respect to axial instrument position (and thus depth) of the various measurements made by the well logging instruments 10, 14 in the wellbore (18 in FIG. 1). In order to produce an accurate record with respect to depth, it is necessary for the time indexed records of both instrument position and instrument measurements to have accurate time identification.

In the system shown in FIG. 2, when a command signal is generated by the recording unit 38 for transmission to the telemetry unit 16 and eventual decoding and routing to a particular instrument (e.g., any of telemetry unit 16, and well logging instruments 10, 14), the time of generation of the command signal may be obtained from the reference clock 38A and appended (added as additional digital bits in one or more time "words") to the command signal as a time datum signal or "time stamp." Thus, the transmission time of the command signal may become part of the command signal itself by such appendage. The command signal may be detected sequentially in each of the repeaters 22A, may processed therein and may be retransmitted toward the next repeater 22A in the pipe string (20 in FIG. 1) until the command signal ultimately reaches the telemetry unit transceiver 16A. At each repeater 22A, there is a time delay related to, among other factors, the length of the command signal and the data processor speed in each repeater. Thus, when the command signal is detected in the telemetry unit 16, there is a time delay between transmission of the command signal and detection thereof related to, among other factors, the number of repeaters 22A and the processing delay inherent in each repeater 22A.

The time delay caused by the repeaters 22A can be accounted and corrected as follows. In a network (e.g., the pipe string 20 in FIG. 1) with a number N of repeaters 22A between the reference clock 38A and the instruments (e.g., telemetry unit 16), each repeater 22A, identified by an index n, where n=1, ..., N, the total repeater delay can be accounted and adjusted by having an accurate (e.g., very stable frequency) and in some examples unsynchronized (i.e., free-running) clock in each repeater 22A that indicates the arrival time $T_{narr}$ of each command signal at the n-th repeater 22A, and the departure time $T_{ndep}$ when that same command signal leaves the same particular repeater 22A. Having the foregoing timing delay information provided at each repeater 22A, the command signal can then carry the timing delay information using a variety of methods.

One example of appending the timing delay information can include appending the arrival and departure times, $T_{narr}$ and $T_{ndep}$ to the command signal at each repeater 22A as it progresses toward the instruments 16, 14, 10, in the wellbore (18 in FIG. 1). Appending the time information at each repeater 22A requires no computation in the repeater 22A, but such appending increases the size of the command signal by two time stamps for each repeater 22A. For example, with a drill string having ten repeaters 22A, and for a digital time stamp represented by two bytes, the command signal will have expanded by 40 bytes when received by the downhole telemetry unit 16.

Another example of appending time delay information includes appending the actual time delay, which is the time difference $T_{ndep}-T_{narr}$, to the command signal at each repeater 22A. Appending the foregoing time delay information to the command signal still increases the size of the command signal at each repeater, but reduces the size of the appendix because only one time value is appended to the command signal at each repeater 22A.

Another example of appending repeater delay time to the command signal includes adjusting the indicated (stamped) reference clock time $T_{ref}$ of the command signal in each repeater 22A to compensate the time stamp for the delay introduced in each repeater 22A. In such case, the arriving signal time stamp $T_{ref}$ is replaced by a new time stamp value $T_{nref}=T_{ref}+(T_{ndep}-T_{narr})$. Changing the reference time at each repeater 22A does not expand the size of the command signal, but the individual delay information from each repeater 22A is lost. Such may be a disadvantage in some circumstances.

Using any of the foregoing repeater time delay adjustment techniques, it is possible to further reduce the required number of bits to be appended to the command signals by taking advantage of the required accuracy versus the dynamic range at each repeater 22A. There are several methods to achieve such results.

In the case of appending the arrival and departure times at each repeater 22A as explained above, the numbers of bits required to append $T_{narr}$ and $T_{ndep}$ are based on the maximum possible delays that a repeater might impose and the time resolution required. For example, if a 1 microsecond time resolution is required, and the maximum delay imposed by a repeater 22A is 1 millisecond, then 10 bits will be adequate to represent the arrival time and departure time.

Similarly, when appending the delay time at each repeater 22A, 10 bits may be adequate for a maximum delay of 1 millisecond, given a 1 microsecond required time resolution.

Finally, in the case of adjusting the reference time at each repeater 22A, It may be possible to synchronize the reference clock 38A to the telemetry unit clock 16C by transmission of a periodic "full length" clock signal, followed by transmission of one or more abbreviated clock signals as appended to various command signals. In such example, the entire value of $T_{nref}$ need not be transmitted from each repeater 22A for each command signal. In one example, a first command signal using the full value of $T_{nref}$ from each repeater 22A may be used to synchronize $T_{ref}$ (at the reference clock 38A) with the clock 16C in the telemetry unit 16, referred to as $T_{down}$. Subsequent command signals may include only enough bits of $T_{ref}$ and $T_{nref}$ to account for the maximum delay of all repeaters 22A and the maximum expected clock drift between each transmission of a full reference clock signal. The frequency of transmission of full reference clock signals $T_{ref}$ will depend on the drift between the reference clock 38A and the telemetry unit clock 16C.

The bandwidth requirement of the foregoing technique can be improved by sending only relative values of the time stamps, such as the difference between two or several time stamps. This requires an intermediate node to have access to two or several time stamps and compute the differences between the values. This requirement can be relaxed by using distributed compression technique that sends ambiguous information to be disambiguated at a central receiver. An example is to send one absolute time stamp, and sending only the lesser significant digits or bits of another time stamp. A receiver that has access to both can then disambiguate the unknown bits of the second time stamp. Another example is by using co-sets of an error-correcting code when a sequence of clock values is to be transmitted. See, for example, S. S. Pradhan, J. Kusuma, K. Ramchandran, *Distributed Compression in a Dense Sensor Network*, IEEE Signal Processing Magazine, March 2002. Co-sets of an error-correcting code select subsets with largest distance within them, and thus are able to tolerate larger values of error in |X−Y|. Further, by using co-set coding, the decoding can be done at the final destination (such as the surface system) where there are more computational resources available, instead of at a repeater 22A Once the command signal with time reference appendix is received by the telemetry unit 16, the time stamp must be computed from the time appendix. If the abbreviated time reference appendix method above is used, the adjusted value of $T_{ref}$ is used as the signal time stamp. No further computation may be needed. For the first two techniques discussed above, including appending arrival and departure times at each repeater 22A, and appending delay time at each repeater 22A, each such delay appendix must added to $T_{ref}$ from the reference clock 38A to determine a corrected $T_{ref}$ at the telemetry unit 16.

The command signal time stamp adjusted as explained above represents an approximate value of the reference clock time $T_{ref}$ when the command signal is received at the telemetry unit 16. Depending upon the particular implementation, the telemetry unit 16 can either correlate its clock 16C with the reference clock 38A, or can synchronize its clock 16C with the reference clock 38A.

For correlation, the telemetry unit clock 16C time value $T_{down}$ recorded when the command signal is received, and any difference between the appended command signal time and the telemetry unit clock time $T_{down}$ may be recorded. The telemetry unit 16 may adjust time stamps applied to measurement signals received from the well logging instruments 14, 10 by the foregoing time difference, or the telemetry unit 16 can transmit the difference to the recording unit 38 appended to signals corresponding, for example, to instrument measurements so that the recording unit can adjust the time appendix to reflect the differences.

For synchronization, the telemetry unit clock 16C is adjusted to match $T_{ref}$. In some examples, a second order control loop can be used, such as one described in U.S. Pat. No. 5,191,326, issued to Montgomery, entitled, "Communications Protocol for Digital Telemetry System" and assigned to the assignee of the present invention. By using such a second order control loop, any clock frequency offset between the reference clock 38A and the telemetry clock 16C may be compensated. In this case, a clock rate of the telemetry unit clock 16C may be calculated from local time values $T_{down}$, and such clock rate adjusted to match a computed clock rate of the reference clock 38A from values of $T_{ref}$, so that clock drift is minimized between the clocks 16C, 38A.

Although delays in each repeater 22A may be accounted for by the forgoing example techniques, signal channel (wired drill pipe conductor system) delays may not be so accounted. For examples of such wired drill pipe systems where the signal channel delay is substantial with respect to the time resolution required, the signal channel delay must be taken into account. An example of determining signal channel delay may be explained as follows. Assuming that channel delays are symmetric for both command signals and measurement signals (that is, in either signal direction), a complete loop can be used to calculate the signal channel delay. A return time signal can be generated using the just synchronized or correlated telemetry unit clock time value. This return time signal will have repeater delays accounted in the same manner as explained above with reference to the command signals. When the measurement signal is received by the recording system 38, the difference between the receiving time and the command time stamp should be twice the signal channel delay. The channel delay value thus calculated can be communicated to the telemetry unit 16, thereby providing more accurate clock correlation or synchronization.

As explained above, accurate depth correlation of measurements made by the well logging instruments 10, 14 requires precise time correlation between the measurements and the time/depth record made by the recording unit 38. Therefore, the telemetry unit 16, at least, must have an accurate time reference with respect to the reference clock 38A. Such time reference may be provided as explained above. Using an accurate time reference for the telemetry unit clock 16C, it is possible to apply accurate time stamps to measurements made by the instruments in the wellbore even if individual instrument clocks (FIG. 3) are not accurate.

In one example measurements made by the instruments are transmitted along an internal instrument bus to the buffer 16B, and can be time stamped by the telemetry clock 16C at the time the measurement is communicated to the buffer 16B. The foregoing may be the simplest approach, however there may be time delay between a particular measurement's actual acquisition time, and when the measurement is transmitted to buffer 16B. Such delay may result from various reasons, e.g., buffer queuing delay, buffer access delay, quality-of-service optimization, re-transmission, decoding delay, because the telemetry unit is programmed or configured to collect and group data from various data sources, or other delays. An accurate measurement time stamp is required regardless of whether the measurement is delayed from acquisition to buffering. There are several possible ways to obtain such accurate time stamping and examples of such are described below.

One example of measurement acquisition time indexing is to synchronize the clock (FIG. 3) of the particular well logging instrument taking the measurement (e.g., well logging instrument 10 or 14) to the telemetry unit clock 16C. If the foregoing synchronization is performed, then a correct measurement time stamp $T_{corr}$ may be provided by the instrument clock and such instrument clock time may be simply appended to the measurement. In such case, $T_{corr}=T_{meas}$, where the latter value is the measurement acquisition time as recorded by the instrument clock. The telemetry system clock 16C may provide a time measurement so that the telemetry unit 16 can itself append ("stamp") the time when the measurement is received. Then, a corrected time stamp $T_{corr}$ for storage and/or communication to the recording unit 38 may be calculated as $T_{down}-(T_{tool}-T_{meas})$.

The particular well logging instrument (e.g., 10 or 14) can calculate the foregoing difference ($T_{tool}-T_{meas}$), and time stamp the measurement with the foregoing calculated delay. Such procedure may save space required for the time stamp on measurement. In such case, a corrected measurements time stamp, $T_{corr}$ is determined as shown above.

It is possible to use the bandwidth reduction techniques explained above for such time stamping in the telemetry unit 16. The number of bits for the local tool clock or the delay can be based on the required time resolution and the maximum expected time delay between acquisition and buffering in the telemetry unit 16. For example, if a 1 microsecond resolution is required, and a 250 microsecond maximum time delay must be accommodated, then 8 bits are sufficient. Further, it is possible to use co-set coding as explained above to further improve the performance when a sequence of time stamps is to be sent or when multiple time stamps with similar values are to be sent. An example of co-set coding is described in, S. S. Pradhan, J. Kusuma, K. Ramchandran, *Distributed Compression in a Dense Sensor Network*, IEEE Signal Processing Magazine, March 2002.

Using the foregoing techniques, the measurement time stamps will be synchronized with the telemetry unit clock 16C. If the telemetry unit clock 16C is synchronized with the reference clock time $T_{ref}$, then the time stamping is complete. $T_{corr}$ will be accurately referenced to the reference clock 38A. Otherwise, means must be provided to compensate the downhole telemetry clock 16C and the reference clock 38A. In this case, a similar method can be used to account for repeater delays as stated earlier.

Depth measured in the recording unit 38 can be transmitted to the telemetry unit 16 using the pipe string signal communication channel as explained with reference to FIG. 1. With depth information communicated to the telemetry unit 16, certain processing can be performed in the instruments in the wellbore themselves with reference to depth domain instead of with reference to time.

In order to save communication channel bandwidth, the depth information can be transmitted to the telemetry unit 16, for example, as a differential once an initial reference point is set. For example, at the beginning of a well, a reference depth may be communicated from the surface to, and subsequently stored in any or each well logging instrument (e.g., 10, 14) in the wellbore. During operation of the system shown in FIG. 1, for example, only a differential value to the reference depth is transmitted to the instruments in the wellbore. When one or more of the well logging instruments (e.g., 10, 14) receive the depth value(s), such instrument(s) (e.g., 10, 14) can update the previously stored reference depth to include the differential. Each time a well logging instrument (e.g., 10, 14) in the wellbore (18 in FIG. 1) receives a new differential value, such instrument (e.g., 10, 14) will correspondingly update the depth based on the previously updated depth. By repeating such procedure, the measurements made by the well logging instruments 10, 14 may be synchronized in depth with respect to the time/depth record made by the recording unit 38.

Alternatively, a master depth reference can be created and stored in one or more of the well logging instruments (e.g., 10, 14) in the wellbore (18 in FIG. 1), and such reference can be synchronized with the time/depth record made by the recording unit 38. The downhole master depth reference may be used by the various well logging instruments (e.g., 10, 14) in the wellbore (18 in FIG. 1) to maintain depth indexed measurements records in each well logging instrument 10, 14 or in another selected instrument (e.g., the telemetry unit 16).

Depth synchronization can be combined with time synchronization to further optimize the process. For example, surface time and depth can be packed into one message and sent to downhole system. In this way, some communication protocol related overhead can be saved.

Figure 3:
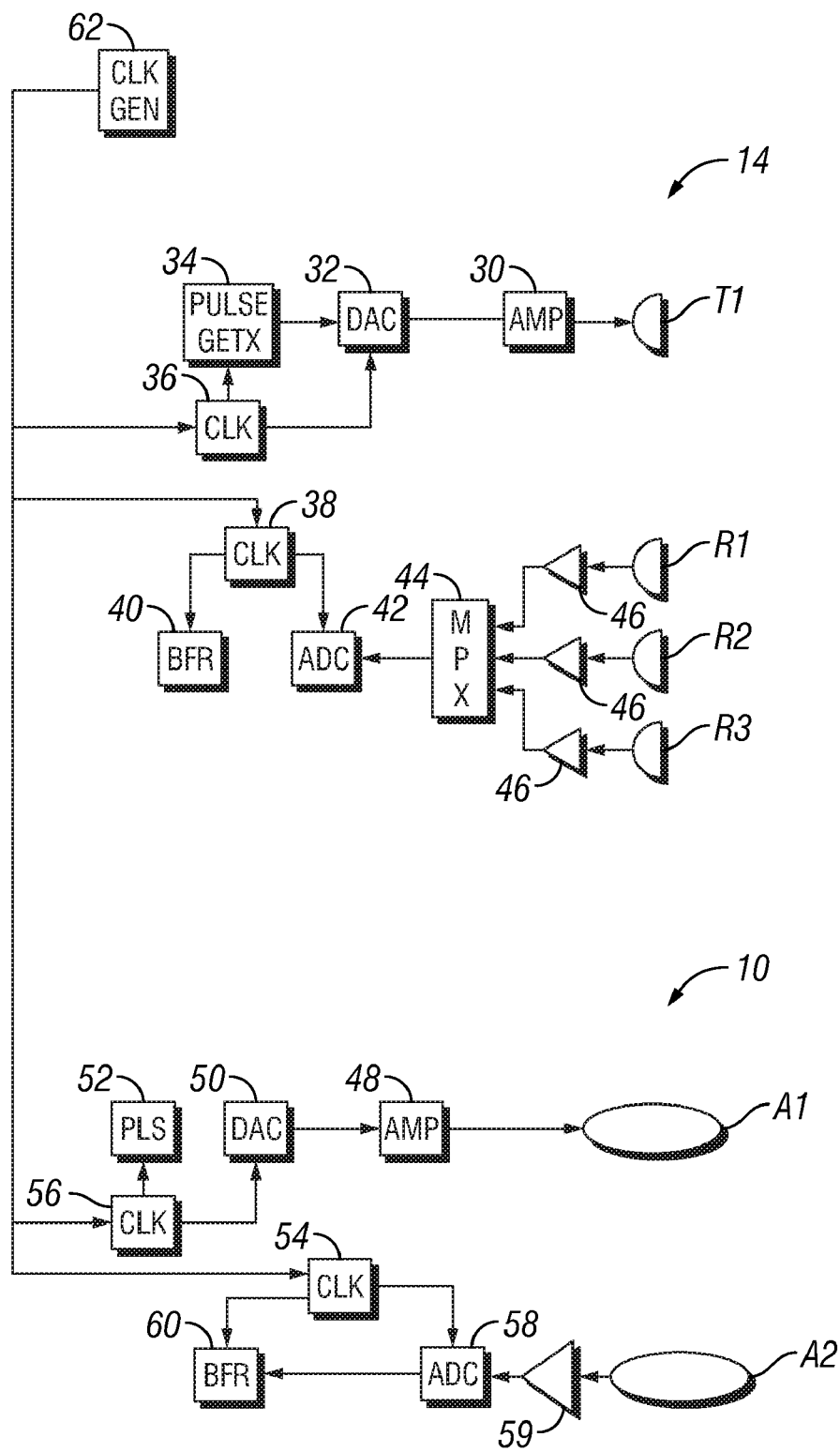
FIG. 3 shows an example of wellbore instruments each having an individual clock to illustrate one example of clock synchronization.

In some examples, the instruments in the wellbore (e.g., 10, 14, 16) may have a plurality of clocks, for example, individual signal generation and signal detection clocks associated with circuitry for energizing transducers to emit energy into the formations surrounding the wellbore, as well as circuits coupled to other transducers for detecting energy related to the formation response to the emitted energy. Such clocks require accurate synchronization to assure that the measurements made correspond to the energy emitted into the formation. FIG. 3 shows in more detail components of the example set of instruments shown more generally in FIGS. 1 and 2.

The first well logging instrument 14, which may be an acoustic measuring device, may include an acoustic transmitter T1 and a plurality of spaced apart acoustic receivers R1, R2, R3. The receivers R1, R1, R3 may each be coupled through a respective preamplifier 46 to a multiplexer 44. Output of the multiplexer 44 may be coupled to an analog to digital converter ("ADC") 42. Signals output from the ADC 42 may be stored in a buffer 40. Operation of the buffer 40 and the ADC 42 may be timed by a local clock 38. The receivers detect acoustic energy that has interacted with the formations outside the wellbore (see FIG. 1). The acoustic energy is produced by a transmitter T1. The transmitter can be operated by a power amplifier 30 having an input signal produced by a digital pulse generator 34 coupled to a digital to analog converter ("DAC") 32. Operation of the DAC 32 and the pulse generator 34 may be timed by a local clock 36.

The second well logging instrument 10 which may be an electromagnetic propagation resistivity measuring device as explained above, may include a transmitter antenna A1 and a receiver antenna A2. Those skilled in the art will appreciate that the number of such antennas in actual implementations of such instruments may be different from the illustrated example in FIG. 3. The example in FIG. 3 is meant only to illustrate the principle of clock synchronization according to the invention and is not intended to limit the type of or configuration of instruments that may be used in other examples. The transmitter antenna A1 may be driven by a signal generation system that may include a digital signal generator 52 coupled to a DAC 50, which is coupled to a power amplifier 48. Output of the power amplifier 48 is coupled to the transmitter antenna A1. A local clock 56 times operation of the foregoing devices. Signal detection in the receiver antenna A2 is performed by a preamplifier 59 coupled to the antenna A2. Output of the preamplifier 59 may be digitized and stored by an ADC 58 coupled to the preamplifier 59 output and a buffer 60 coupled to the ADC output. Operation of the foregoing may be timed by a local clock 54.

In order for the signals that are generated and detected by the foregoing devices to be accurately timed, it is necessary for the local clocks 36, 38, 56, 54 to be synchronized. In the present example, clock synchronization may be performed by a clock signal generator 62 in signal communication with the foregoing local clocks. In other examples, one or more of the local clocks may provide the synchronization signal.

In the present example, the clock generator 62 can generate a signal that has an autocorrelation narrower in time than the period of the signal produced by the clock generator 62. In clock synchronization techniques known in the art prior to the present invention, a clock generator is configured to produce, for example a sine wave signal having a selected time duration. Expressed differently, a sine wave or other baseband signal is modulated by switching the baseband signal on and off for a selected period of time. The local clocks may be configured to correlate the switched baseband signal, wherein timing information is derived from the correlation function. The time of the clock generator signal is determined to be at the peak of the correlation function. The time duration (width) of the correlation function is related to the width of the autocorrelation function of the clock generator signal. For the switched baseband signal described above, the autocorrelation function is substantially the same width as the width of the switched baseband signal.

In the present invention, the clock generator produces a signal having an autocorrelation function that is shorter in time duration than the time duration (period) of a baseband or passband generator signal. One possible way for constructing a clock generator signal, represented by x(t), with such a narrow autocorrelation function is to modulate a selected frequency carrier wave (baseband or passband signal) using a pseudo-random sequence of bits or symbols. For example, let q[n] be such a pseudo-random sequence of bits or symbols, having values of either −1 or +1. The clock generator signal output x(t) can then be represented by the expression:

$$x(t) = \sum_n q[n]p(t-nT_r)$$

Where the carrier, represented by p(t) can be chosen to be an appropriate shape. $T_r$ represents the bit rate of the bit sequence q[n]. For example, p(t) can be a square-root raised cosine pulse that is commonly used in communication applications, such that its energy is concentrated around frequency bands [0, W] and q[n] can be a Barker sequence, a linear feedback shift register sequence (maximum length or M-sequence), or a complex-valued CAZAC (Constant-Amplitude, Zero Auto-Correlation) sequence.

In the above, x(t) can be a baseband signal. Alternatively, x(t) can be a passband signal with carrier frequency $f_c$ as follows:

$$x(t)=s(t)\cos(2\pi f_c t); \text{ and}$$

$$s(t) = \sum_n q[n]p(t-nT_r)$$

Substantively, s(t) generated as explained above replaces the rectangular clock pulse used in prior art clock synchronization methods. Timing is determined at each local clock by correlating the clock generator output with a locally generated clock signal that includes the same bit sequence q[n] used to generate the clock generator signal.

By the principle of time-frequency duality, if the autocorrelation of s(t) is narrower than $w_{T(t)}$, then its spectrum is wider. The width of the autocorrelation function is determined by the choice of the sequence q[n] and its bit rate $T_r$ given in the construction of s(t). Therefore it is possible to select the particular bandwidth and time resolution of the clock generator signal for the intended purpose.

The clock generator signal can be baseband or passband (with a carrier). The generation of clock generator signal can be performed partially or completely in the analog domain. The receiver at each local clock can partially or completely be implemented in the analog domain. The clock generator signal x(t) can be chosen from but not limited to a pseudorandom sequence signal. Such a signal can be modulated to have carrier frequency. For convenience, such a signal maybe selected to have the form $$x(t)=s(t)\cos(2\pi f_c t); \text{ and}$$

where s(t) is chosen to have a bandwidth within defined limits [−W,W]. It can be convenient to choose s(t) to be a filtered sequence, for example:

$$s(t) = \sum_n q[n]f(t-nT)$$

Further, the sequence q[n] can be chosen to be a pseudo-random sequence such as a linear feedback shift register sequence, a Barker sequence, or a member of a family of Gold sequences. The filter f(t−nT) or its convolution f(t)*f(−t) can be chosen to form an orthonormal set. Examples include square-root raised cosine function, sinc functions, spline functions, wavelet functions, square waves, etc. The time delay estimation can be implemented in several ways, including correlation, peak determination and threshold determination. The foregoing clock synchronization method can also be generalized to allow for simultaneous measurements from various transmitters and receivers/sensors in the same frequency band. For example, different transmitters can be assigned different sequences from a set of orthogonal sequences such as Gold sequences. Such examples may include sequences that have substantially zero cross correlation. Further, in such examples one receiver can include computation of the correlation function with respect to several different transmitted signals simultaneously.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for synchronizing clocks in a wellbore instrument, comprising:
    generating a clock signal at a first clock;
    detecting the clock signal at a second clock;
    adjusting a timing of the second clock corresponding to the clock signal, the clock signal having an autocorrelation function narrower in time than a period of the clock signal, the detecting comprising at least one of correlation, peak detection and threshold detection; and
    generating a clock signal at the second clock.

2. The method of claim 1 wherein the clock signal comprises a pseudorandom sequence.

3. The method of claim 1 wherein the clock signal comprises a baseband signal.

4. The method of claim 1 wherein the clock signal comprises a passband signal.

5. A system including the method of claim 1, further comprising:
    a clock generator to generate the clock signal at the first clock;
    a receiver to detect the clock signal at the second clock; and
    a calculator in the receiver to adjust the timing of the second clock corresponding to the clock signal.

6. A system for synchronizing clocks in a wellbore instrument comprising:
    a clock generator in a first clock to generate a clock signal at the first clock;

a receiver to detect the clock signal at the second clock; and a calculator in the receiver to adjust the timing of the second clock corresponding to the clock signal, the clock signal having an autocorrelation function narrower in time than a period of the clock signal, the receiver comprising at least one of correlation, peak detection and threshold detection.

7. The system of claim 6 wherein the clock signal comprises a pseudorandom sequence.

8. The system of claim 6 wherein the clock signal comprises a baseband signal.

9. The system of claim 6 wherein the clock signal comprises a passband signal.

10. A system for synchronizing a clock associated with a device disposed at the Earth's surface with a clock associated with at least one instrument disposed in a subsurface wellbore, the surface device and the wellbore device in signal communication using a communication channel in a wired pipe string, the wired pipe string including at least one repeater disposed between a surface end and a lower end in the wellbore thereof, the system comprising:

a clock time datum generator associated with at least one of the surface device and the wellbore device, the time datum generator configured to append a time datum to a signal generated by the at least one of the surface device and the wellbore device;

the at least one repeater comprising:
a detector configured to detect the signal from the at least one of the wellbore device and the surface device, a transmitter to retransmit the detected signal, and
a time delay calculator configured to:
determine a delay time between detection of the signal and retransmission thereof, the time delay calculator configured to alter the detected signal with a signal corresponding to the time delay; and
adjust the time datum in the detected signal by a time amount corresponding to a difference between the detection time and the retransmission time.

11. The system of claim 10 wherein the time delay calculator is configured to append the time datum with a signal corresponding to the detection time at the at least one repeater and a signal corresponding to the retransmission time.

12. The system of claim 10 wherein the time delay calculator is configured append the time datum with a signal corresponding to a difference between the detection time at the at least one repeater and the retransmission time.

13. The system of claim 10 wherein the at least one device in the wellbore comprises a well logging instrument.

14. The system of claim 10 wherein the time delay calculator is configured to append the detected signal with a time signal corresponding to the detection time at the at least one repeater and a signal corresponding to the retransmission time.

15. The system of claim 10 wherein the time delay calculator is configured append the detected signal with a time signal corresponding to a difference between the detection time at the at least one repeater and the retransmission time.

16. The system of claim 10 further comprising:
a sensor disposed proximate the surface for measuring an instrument depth in the wellbore with respect to time, and wherein the surface device is configured to append the time datum with the measured depth.

17. A method for synchronizing a clock in a device at the Earth's surface with a clock in a device disposed in a wellbore, wherein signals are communicated therebetween along a wired pipe string having therein at least one signal repeater disposed at a selected position between an upper end and a lower end of the wired pipe string, the method comprising:

generating a time datum for a signal generated by one of the surface device and the device disposed in the wellbore;

transmitting the generated signal along the wired pipe string to the at least one repeater;

detecting the generated signal in the at least one repeater;

determining a time delay between detection of the signal at the at least one repeater and retransmission of the signal from the at least one repeater;

appending the time datum with a signal corresponding to the time delay; and retransmitting the signal with the appended time datum by the at least one repeater;

wherein the appending the time datum comprises adjusting the time datum by a time amount corresponding to a difference between the detection time at the at least one repeater and the retransmission time.

18. The method of claim 17 further comprising detecting the retransmitted signal at the other of the device at the surface and the device in the wellbore.

19. The method of claim 17 wherein the appending the time datum comprises a signal corresponding to the detection time at the at least one repeater and a signal corresponding to the retransmission time.

20. The method of claim 17 wherein the appending the time datum comprises a signal corresponding to a difference between the detection time at the at least one repeater and the retransmission time.

21. The method of claim 17 wherein the bandwidth requirement in appending the time datum is reduced by limiting the resolution of the time datum based on the clock resolution required and the maximum number of clock cycles of delay to be recorded.

22. The method of claim 17 further comprising:
measuring at the surface an instrument depth in a wellbore with respect to time;
appending the time datum with the measured depth; and
transmitting the appended time datum to the device in the wellbore.

23. The method of claim 17 further comprising measuring at least one formation parameter using the device in the wellbore and appending the measurement of the at least one formation parameter with a time datum corresponding to the retransmitted signal originating from the surface device.

24. The method of claim 17 further comprising determining a time delay corresponding to transmission of signals along the wired pipe string from the surface device to the device in the wellbore, and adjusting the detected retransmitted signal for the wired pipe string transmission delay.

25. The method of claim 17 wherein the a time datum for a signal generated at least one of the surface and at a position in the wellbore proximate an end of the pipe string are measured for round trip travel time, half of that travel time being used to compensate for channel time lag in each direction.

\* \* \* \* \*